United States Patent
Vahabzadeh et al.

(10) Patent No.: US 8,240,443 B2
(45) Date of Patent: Aug. 14, 2012

(54) POWERTRAIN WITH ENGINE OIL-FED TORQUE CONVERTER

(75) Inventors: Hamid Vahabzadeh, Oakland, MI (US);
Scott H. Wittkopp, Ypsilanti, MI (US);
Edwin T. Grochowski, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 819 days.

(21) Appl. No.: 12/268,478

(22) Filed: Nov. 11, 2008

(65) Prior Publication Data
US 2010/0038200 A1 Feb. 18, 2010

Related U.S. Application Data

(60) Provisional application No. 61/088,451, filed on Aug. 13, 2008.

(51) Int. Cl.
*F16D 33/16* (2006.01)
(52) U.S. Cl. .................. 192/3.3; 192/85.63; 192/109 F
(58) Field of Classification Search .............. 192/3.29, 192/3.3, 3.21, 3.26, 3.33, 85.63, 109 F; 60/330, 60/358, 336, 339
See application file for complete search history.

(56) References Cited

U.S. PATENT DOCUMENTS

| | | | | |
|---|---|---|---|---|
| 2,701,948 A * | 2/1955 | Iavelli et al. | ............ | 60/339 |
| 2,747,431 A * | 5/1956 | Roche | | |
| 2,828,651 A * | 4/1958 | Duffield | ........... | 192/3.3 X |
| 2,917,950 A * | 12/1959 | Duffield | .......... | 192/3.33 X |
| 3,185,273 A * | 5/1965 | Smirl | ............. | 192/3.3 |
| 3,245,502 A * | 4/1966 | Randol | .......... | 192/109 F X |
| 3,435,612 A * | 4/1969 | Hensler | .......... | 60/358 X |
| 3,745,643 A * | 7/1973 | Hause | | |
| 4,376,370 A * | 3/1983 | Kinugasa et al. | .......... | 60/339 X |
| 4,860,861 A | 8/1989 | Gooch et al. | | |
| 4,970,860 A * | 11/1990 | Mezger et al. | .......... | 60/358 X |
| 5,090,528 A | 2/1992 | Massel | | |
| 5,400,884 A * | 3/1995 | Matsuoka | .......... | 192/3.3 X |
| 5,778,668 A * | 7/1998 | Adleff et al. | ........... | 60/339 |
| 6,325,190 B1 | 12/2001 | Yoshimoto et al. | | |
| 6,390,262 B2 * | 5/2002 | Yoshimoto et al. | ........ | 192/3.21 X |
| 6,508,345 B1 * | 1/2003 | Yoshimoto et al. | ........ | 192/3.29 X |
| 6,837,209 B2 * | 1/2005 | Hori et al. | | |
| 6,925,798 B2 * | 8/2005 | Hori et al. | ............ | 60/336 |
| 6,941,838 B2 * | 9/2005 | Hori et al. | ............ | 192/3.21 X |
| 2009/0241532 A1* | 10/2009 | Ito et al. | ............ | 60/330 |

FOREIGN PATENT DOCUMENTS

| | | |
|---|---|---|
| CN | 1032579 A | 4/1989 |
| CN | 1257018 A | 6/2000 |
| CN | 1755168 A | 4/2006 |

* cited by examiner

*Primary Examiner* — Gregory Binda
*Assistant Examiner* — Matthieu Setliff
(74) *Attorney, Agent, or Firm* — Quinn Law Group, PLLC

(57) ABSTRACT

A powertrain is provided that has an engine and a torque converter. The engine is configured to provide oil to the torque converter for operation of the torque converter. The engine oil may provide both the fluid coupling and torque converter clutch apply and release functions.

8 Claims, 4 Drawing Sheets

US 8,240,443 B2

POWERTRAIN WITH ENGINE OIL-FED TORQUE CONVERTER

CROSS-REFERENCE TO RELATED APPLICATIONS

This application claims the benefit of U.S. Provisional Patent Application No. 61/088,451, filed Aug. 13, 2008, and which is hereby incorporated by reference in its entirety.

TECHNICAL FIELD

The invention relates to a powertrain having a torque converter.

BACKGROUND OF THE INVENTION

Torque converters are known fluid coupling devices used in automotive powertrains for connecting engine output with transmission input. The torque converter provides a torque multiplier and speed differential between the engine and transmission gearing. The fluid coupling function of the torque converter enables a smooth transmission of power during launch, shifting, as well as coasting. A torque converter clutch may or may not be employed to connect the engine to the transmission (bypassing the torque converter) and thereby improve the overall efficiency of the transmission.

SUMMARY OF THE INVENTION

A powertrain is provided that has an engine and a torque converter. The engine is configured to provide oil to the torque converter for operation of the torque converter. The engine oil may provide both the fluid coupling and torque converter clutch apply and release functions.

In some embodiments, the input member at least partially defines a feed passage to provide oil to the torque converter and a return passage to return oil from the torque converter to the engine.

The engine may include a crankshaft that partially surrounds the input member, an engine block, and a bearing between the crankshaft and an engine block. Either or both of the feed and return passages may also be in fluid communication with the bearing. Thus, a feed to the bearing may be used to further feed to the torque converter.

In other embodiments, the torque converter housing or the transmission housing forms feed and return passages, and external tubes mount to the housing. The tubes are in fluid communication with the feed and return passages formed in the torque converter housing at one end, and in fluid communication with the engine pump and the engine sump, respectively, at the other end.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
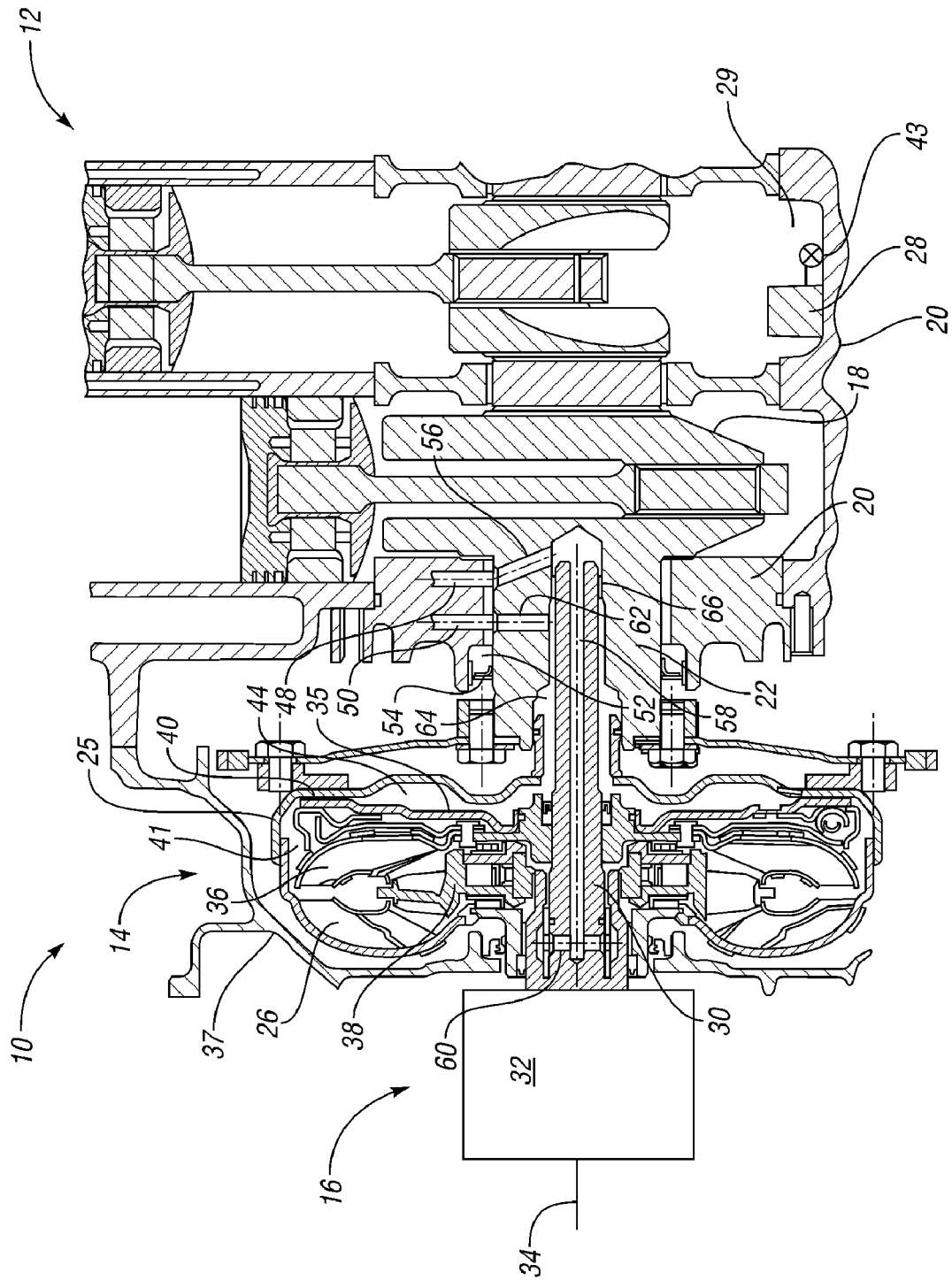
FIG. 1 is a schematic cross-sectional illustration of a first embodiment of a powertrain having a torque converter that is fed engine oil by an engine.

Referring to the drawings, wherein like reference numbers refer to like components, FIG. 1 shows a powertrain 10 with an engine 12, a torque converter 14 and a transmission 16 represented by a transmission gearing arrangement. A transmission casing or housing is not shown in FIG. 1, but surrounds the transmission gearing arrangement and mounts to the torque converter housing 37. The engine 12 is configured to feed pressurized oil to the torque converter 14 and receive the oil returned from the torque converter 14 as described herein.

The engine 12 has a crankshaft 18 enclosed within an engine block 20. An output member portion 22 of the crankshaft 18 is connected for rotation with a pump portion 26 of the torque converter 14 via a hub 25. The engine 12 is a fluid supply source as it contains pressurized oil for lubricating and cooling the crankshaft 18 and other engine components. An engine pump 28 acts as a pressure source for pressurizing the oil. The engine pump 28 is shown within the engine block 20 and may be located anywhere in communication with the oil within the engine block 20. After use for cooling and lubrication through the engine 12 and torque converter 14, the oil is returned to a nonpressurized sump 29 located anywhere within the vicinity of the pump 28, for pressurization and recirculation by the pump 28. Typically, the sump 29 is within an oil pan at a portion of the engine 12 where oil migrates by gravity.

The torque converter 14 acts as a fluid coupling to transfer torque from the engine output portion 22 to a transmission input member 30. The transmission input member 30 is connected with a transmission gearing arrangement 32 for providing various speed ratios between the input member 30 and a transmission output member 34 operatively connected to a final drive (not shown).

The torque converter 14 also includes a turbine portion 36 connected via a hub 35 for rotation with the input member 30, and a stator portion 38. Fluid within the torque converter 14 creates a fluid coupling between the pump portion 26 and the turbine portion 36 to transfer torque from the engine crankshaft output portion 22 to the input member 30. A torque converter housing 37, shown in fragmentary view only, surrounds the torque converter 14 and is connected with the engine block 20 and with a transmission casing or housing (not shown) of the transmission 16 that surrounds transmission gearing arrangement 32.

The torque converter 14 includes a selectively engagable torque converter clutch 40, sometimes referred to as a lockup or bypass clutch as it is engagable to provide a direct mechanical connection from the output portion 22 to the input member 30, bypassing the fluid coupling of the pump portion 26 and turbine portion 36. Pressurized fluid is supplied to release cavity 44 to force torque converter clutch hub 25 away from torque converter clutch hub 35. The fluid is thus able to flow from cavity 44 through an apply cavity 41, and is exhausted through the torque converter 14 as described below.

Flow may be reversed by a controllable valve 43, so that pressurized fluid is supplied to apply cavity 41 to act on torque converter clutch hub 35 to apply the torque converter clutch 40. With the torque converter clutch 40 engaged, the fluid in the torque converter 14 cannot exhaust.

The fluid coupling 26, 36 and the apply cavity 41 are in fluid communication with the pressurized oil supply provided by the pump 28 when it is desired to engage the torque converter clutch 40. By switching the valve 43, the release cavity 44 is in fluid communication with the pump 28 when it is desired to release the clutch 40. Specifically, the engine block 20 forms a supply passage 50, only partially shown, but which is fluidly connected with the pump 28 through bored or cast passages in the block 20 and/or tubes. The engine block 20 further forms a return passage 48 by which pressurized oil is returned to the sump 29 through the engine block 20. Both the supply passage 50 and the return passage 48 are in fluid communication with a bearing cavity 52 which supplies lubricating oil from the engine pump 28 to a bearing 54 positioned between the engine block 20 and the engine output portion 22.

The engine output portion 22 has a supply passage 62 that communicates with the supply passage 50 and with a feed passage 64 formed between the outer surface of the input member 30 and the engine output portion 22. A return passage 56 in the engine output portion 22 is in fluid communication with an axial central bore in the input member 30 that forms a return passage 58. A radial bore 60 in input member 30 communicates fluid in the torque converter fluid coupling 26, 36 and the cavity 41 with the return passage 58.

Feed passage 64 is in fluid communication with supply passages 50, 62. A bushing 66 is positioned between and contacts the engine output portion 22 and the input member 30 to separate the fluid supply passage 62 and feed passage 64 from the return passages 56, 58.

Thus, the engine 12 supplies the torque converter 14 with pressurized engine oil to serve both the fluid coupling and the clutch apply functions of the torque converter 14. No fluid is supplied from the transmission 16 to the torque converter 14.

Second Embodiment

Figure 2:
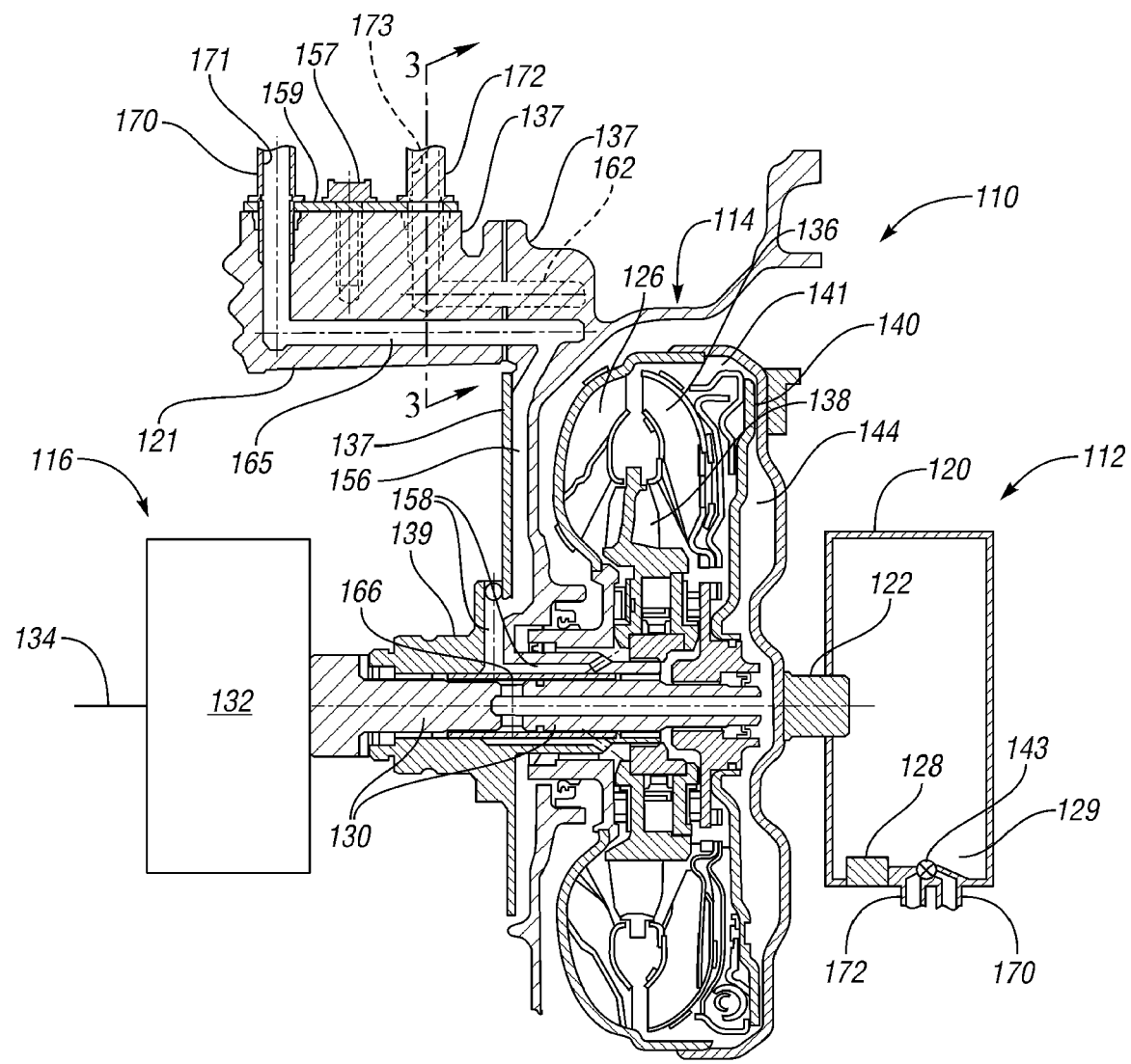
FIG. 2 is a schematic cross-sectional illustration of a second embodiment of a powertrain having a torque converter fed engine oil by an engine, showing a torque converter return passage.

Referring to FIG. 2, a powertrain 110 is shown having an engine 112, a torque converter 114 and a transmission 116. The engine 112 includes a crankshaft, shown only in part as an engine output portion 122 connected through the torque converter 114 to an input member 130 of transmission 116. Torque is thus provided from the engine output portion 122 through a fluid coupling in the torque converter 114 to the input member 130 and through the transmission gearing arrangement 132 to a transmission output member 134, as described with respect to the similar components of identical function shown in FIG. 1.

The torque converter 114 has a housing 137 (shown in fragmentary view) that surrounds the torque converter pump portion 126, turbine portion 136, stator portion 138 and torque converter clutch 140. The torque converter housing 137 mounts to the engine block 120, similar to the mounting of housing 37 to engine block 20 in FIG. 1. The engine block 120 is shown only schematically and not to scale with respect to the torque converter 114 in FIGS. 2 and 3. A portion of a transmission casing 121 that surrounds the transmission gearing arrangement 132 is mounted to the torque converter housing 137.

Figure 3:
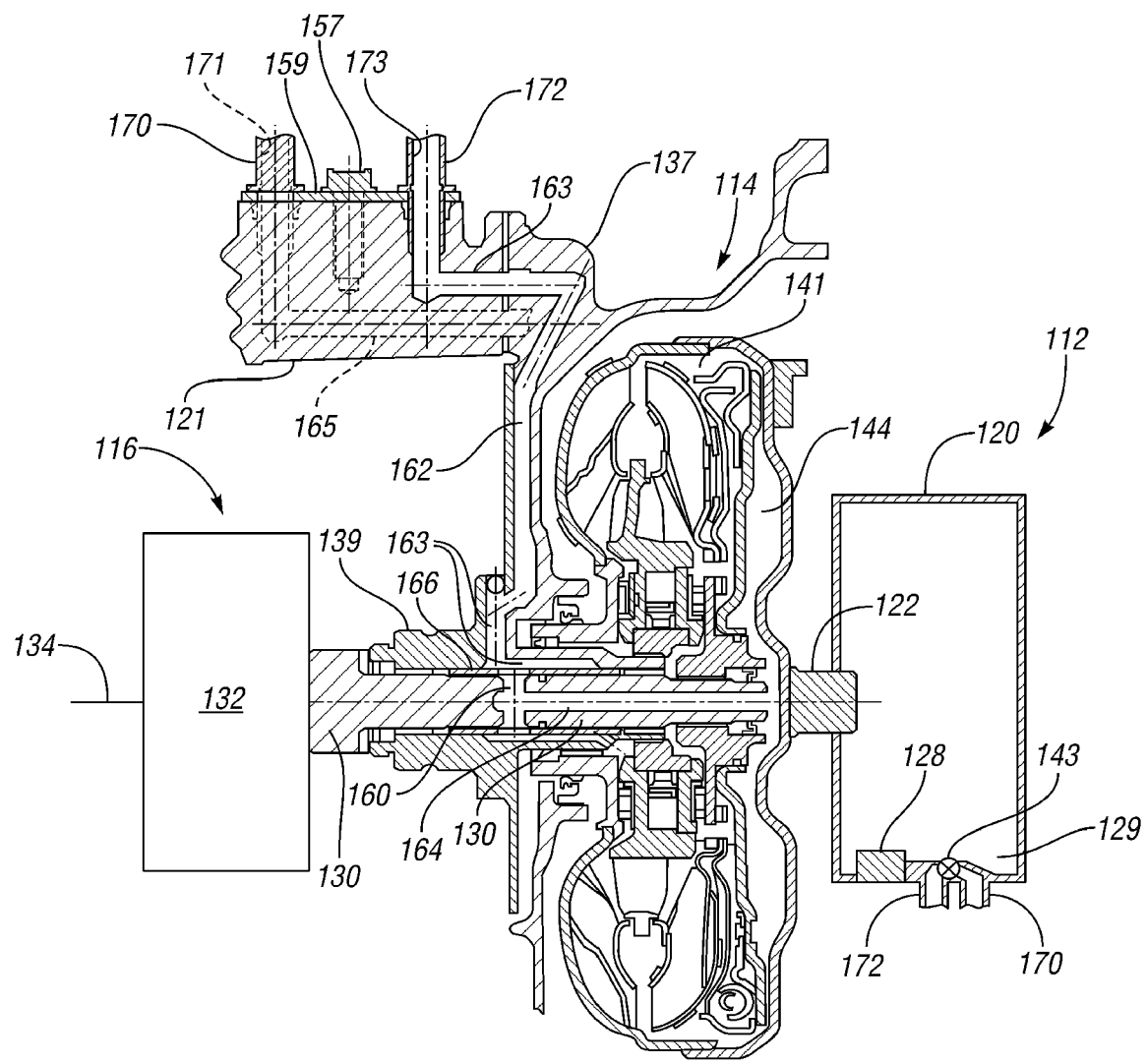
FIG. 3 is a schematic cross-sectional illustration of the powertrain of FIG. 2 taken at the lines 3-3 showing a torque converter feed passage.

Referring to FIGS. 2 and 3, the torque converter housing 137 defines a feed passage 162 and a return passage 156. The feed passage 162 and return passage 156 are approximately at the same axial location but extend in different radial directions offset from one another so that each is shown at different cross-sections taken through the powertrain 110 shown in FIGS. 2 and 3. The transmission housing 121 forms a feed passage 163 in fluid communication with feed passage 162, and a return passage 165 in fluid communication with return passage 156.

A bolt 157 attaches a tube assembly to the outside of the transmission housing 121. The tube assembly includes a plate 159 with an external return tube 170 and an external feed tube 172 brazed and/or pressed into the plate 159. A gasket (not shown) is placed between the plate 159 and the housing 121. The external return tube 170 is thus mounted to the transmission casing 121 and forms a return channel 171 in fluid communication with the return passage 165. An opposite end of the return tube 170 mounts to the engine block 120 in fluid communication with a sump 129 of the engine 112 (or with engine pump 128, depending on the position of the valve 143).

The external feed tube 172 is also mounted to the transmission housing 121 and forms a feed channel 173 in fluid communication with the feed passage 162. An opposite end of the feed tube 172 mounts to the engine block 120 in fluid communication with engine pump 128 for delivering pressurized fluid to the torque converter 114 (or in fluid communication with sump 129 depending on the position of valve 143).

As shown in FIG. 2, the return passage 156 is formed by a series of bored or cast passages through the housing 137 and communicates with a return passage 158 in stator shaft 139 to return fluid to the engine 112 from the pump portion 126, and turbine portion 136, as well as from the release cavity 144 through the disengaged torque converter clutch 140. These components of the torque converter 114 operate in like manner as described with respect to the like components of FIG. 1. A stator sleeve 166 between the input member 130 and the stator shaft 139 prevents communication between the return passage 158 and a feed passage 164 and a bore 160 of FIG. 3.

Referring to FIG. 3, the feed passage 162 is formed by a series of bored or cast passages in the torque converter housing 137. The input member 130 forms feed passage 164 in fluid communication with release cavity 144 in the torque converter 114, and with the feed passage 162 via a radial bore 160 and a feed passage 163 in stator shaft 139. The stator sleeve 166 has openings that align with the bore 160 and with feed passage 163 so that communication with feed passage 164 is permitted (i.e., sleeve 166 does not block flow from passage 162 as it does from passage 156 of FIG. 2). The valve 143 may be electronically controlled to switch the direction of fluid flow (i.e., switch the connection of pump 128 to tube 170 instead of tube 172) to feed fluid into the apply cavity 141 to engage the torque converter clutch 140

Thus, the engine 112 supplies the torque converter 114 with pressurized engine oil to serve both the fluid coupling and the clutch apply functions of the torque converter 114. No fluid is supplied from the transmission 116 to the torque converter 114.

Third Embodiment

Figure 4:
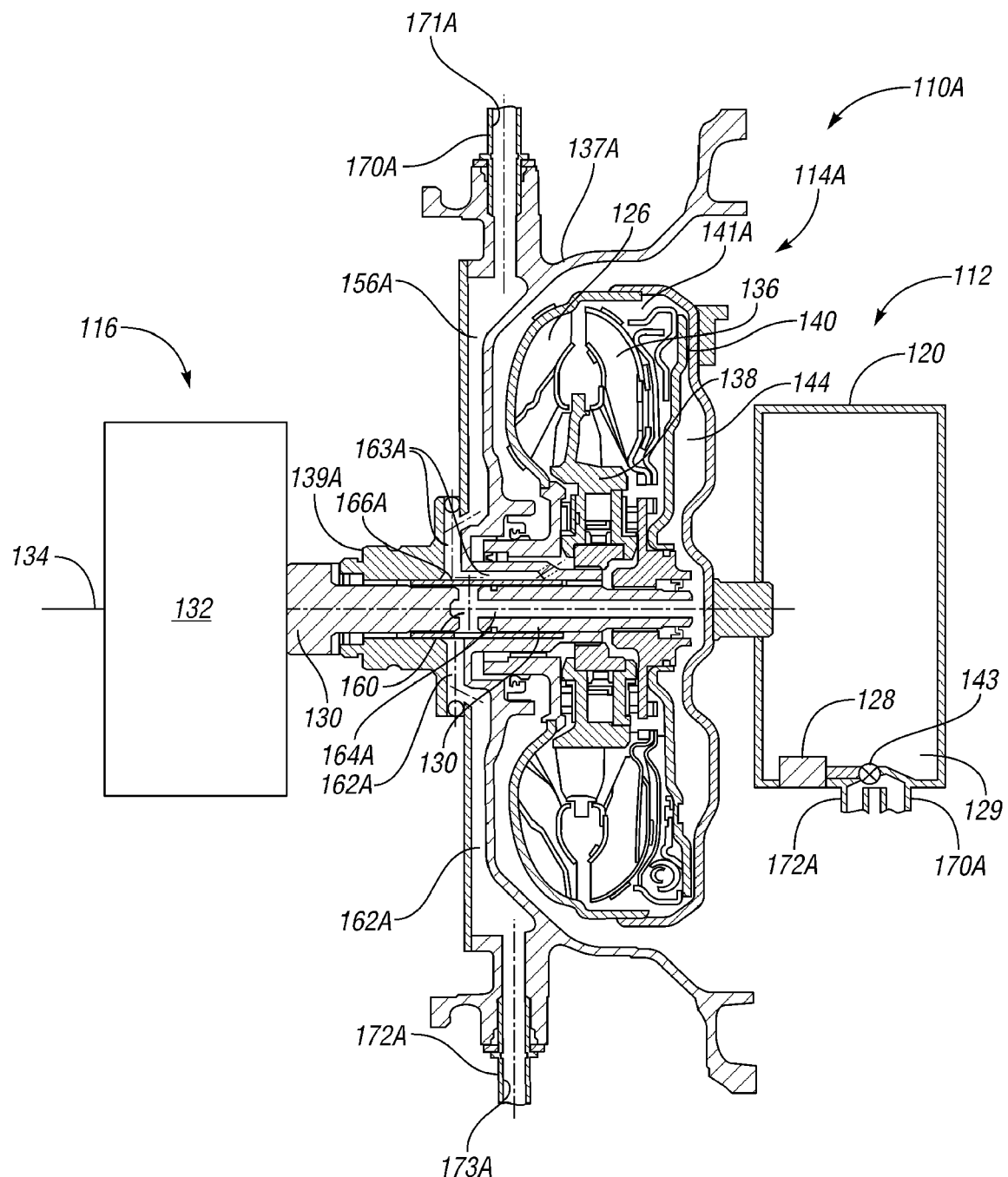
FIG. 4 is a schematic cross-sectional illustration of a third embodiment of a powertrain having a torque converter fed engine oil by an engine.

Referring to FIG. 4, another embodiment of a powertrain 110A is illustrated. The powertrain 110A is similar to that of FIGS. 2 and 3, and identical reference numbers are used to refer to identical components. In this embodiment, an external feed tube 172A and external return tube 170A are mounted to the torque converter housing 137A approximately 180 degrees apart from one another. Return tube 170A forms return channel 171A and feed tube 172A forms feed channel 173A. A return passage 156A bored or cast in torque converter housing 137A is fluidly connected with return passage 163A in stator shaft 139A. Pressurized engine oil from the engine 112 via pump 128 and tube 172A is fed to release cavity 144 via feed passage 162A, feed passage 164A formed in input member 130 and via radial bore 160 to keep torque converter clutch 140 released, and through the fluid coupling 126, 138 of the torque converter 114A through passages 163A, 156A to tube 170A and sump 129. Sleeve 166A has a radial opening positioned to allow fluid communication from feed passage 162A to feed passage 164A through radial bore 160, but sleeve 166A prevents fluid communication between passage 163A and radial bore 160 as well as feed passage 164A. A return passage 156A connects the release cavity 144 to the sump 129. To engage the torque converter clutch 140, as valve 143 is switched and fluid flow through the torque converter 114A is reversed, with pressurized fluid fed through passages 171A, 156A, and 163A to cavity 141A to cause engagement of torque converter clutch 140. Thus, the engine 112 supplies the torque converter 114A with pressurized engine oil to serve both the fluid coupling and the clutch apply functions of the torque converter 114A. No fluid is supplied from the transmission 116 to the torque converter 114A.

While the best modes for carrying out the invention have been described in detail, those familiar with the art to which this invention relates will recognize various alternative designs and embodiments for practicing the invention within the scope of the appended claims.

The invention claimed is:

1. A powertrain comprising:
   an engine;
   a torque converter with a stator portion supported on a stator shaft; wherein the stator shaft has a stator shaft feed passage and a stator shaft return passage; and wherein the torque converter has a torque converter housing with a torque converter housing feed passage and a torque converter housing return passage;
   wherein the engine is configured to provide oil to the torque converter housing feed passage through the stator shaft feed passage for operation of the torque converter; wherein the oil provided by the engine forms a fluid coupling in the torque converter;
   a transmission having an input member operatively connected with the engine through the torque converter;
   wherein the input member at least partially defines an input member feed passage to provide oil from the engine to the torque converter housing feed passage through the stator shaft feed passage; wherein the input member at least partially defines an input member return passage to return oil from the torque converter housing return passage to the engine through the stator shaft return passage;
   a stator sleeve between the input member and the stator shaft configured to permit flow from the input member feed passage to the torque converter housing feed passage through the stator shaft feed passage; and wherein the stator sleeve is further configured to prevent flow from the torque converter housing return passage to the input member feed passage through the stator shaft return passage.

2. The powertrain of claim 1, wherein the torque converter includes a torque converter clutch; and wherein the oil provided by the engine applies and releases the torque converter clutch.

3. The powertrain of claim 1, wherein the engine includes an engine block; and further comprising:
   at least one object external to both the torque converter housing and the engine block and defining a feed channel operatively connecting the torque converter housing feed passage with the engine block and defining an external return channel operatively connecting the torque converter housing return passage with the engine block.

4. The powertrain of claim 3, wherein the at least one object includes a feed tube and a return tube.

5. A powertrain comprising:
   a transmission;
   an engine having an engine block and a crankshaft;
   a bearing supporting the crankshaft at the engine block; and
   a torque converter operatively connecting the engine crankshaft with the transmission and including a torque converter clutch;
   wherein the engine is configured to provide oil to the torque converter clutch for operation of the torque converter clutch; wherein the crankshaft and the engine block define a cavity for providing engine oil to the bearing; wherein the crankshaft defines at least one supply passage in fluid communication with both the cavity and the torque converter clutch;
   wherein the transmission input member and the crankshaft define at least one return passage; and
   a bushing separating the supply passage and the return passage.

6. A powertrain comprising:
   an engine having an engine block, a pressurized oil supply and an oil sump;
   a torque converter having a torque converter housing defining fluid passages; and
   tubes mounted to the torque converter housing external to the engine and the torque converter housing and in fluid communication with the pressurized oil supply, the sump, and the torque converter housing fluid passages to feed engine oil to the torque converter and to return engine oil from the torque converter to the sump for operation of the torque converter.

7. The powertrain of claim 5, wherein the bushing is between and contacts the crankshaft and the transmission input member.

8. The powertrain of claim 6, wherein the torque converter has a torque converter clutch; and wherein the engine oil provided by the engine applies and releases the torque converter clutch.

* * * * *